(12) United States Patent
Hall et al.

(10) Patent No.: US 10,683,895 B2
(45) Date of Patent: *Jun. 16, 2020

(54) SYSTEMS AND DEVICES USING HARD BEARINGS

(71) Applicant: Schlumberger Technology Corporation, Sugar Land, TX (US)

(72) Inventors: David R. Hall, Provo, UT (US); Jonathan D. Marshall, Springville, UT (US); Scott S. Dahlgren, Provo, UT (US); Daniel Manwill, Provo, UT (US); R. Craig Boswell, Draper, UT (US); Scott Richard Woolston, Provo, UT (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/040,182

(22) Filed: Jul. 19, 2018

(65) Prior Publication Data

US 2018/0320740 A1 Nov. 8, 2018

Related U.S. Application Data

(63) Continuation of application No. 15/122,662, filed as application No. PCT/US2015/018563 on Mar. 4, 2015, now Pat. No. 10,030,704.

(Continued)

(51) Int. Cl.
*F16C 33/04* (2006.01)
*E21B 41/00* (2006.01)
(Continued)

(52) U.S. Cl.
CPC ............ *F16C 33/043* (2013.01); *E21B 4/003* (2013.01); *E21B 4/006* (2013.01); *E21B 41/00* (2013.01);
(Continued)

(58) Field of Classification Search
CPC ........ F16C 33/043; F16C 17/12; F16C 29/02; F16C 2380/26; F16C 2361/61;
(Continued)

(56) References Cited

U.S. PATENT DOCUMENTS

| | | | |
|---|---|---|---|
| 1,902,150 A | 3/1933 | Weis et al. | |
| 3,580,547 A | 5/1971 | Amorese et al. | |

(Continued)

FOREIGN PATENT DOCUMENTS

| | | |
|---|---|---|
| EP | 0285453 A2 | 10/1988 |
| EP | 0559582 A1 | 9/1993 |

OTHER PUBLICATIONS

International Search Report and Written Opinion issued in International Patent application PCT/US2012/018563 on May 29, 2015. 13 pages.

(Continued)

*Primary Examiner* — James G Sayre

(57) ABSTRACT

Aspects of the disclosure can relate to an apparatus including a first member having a first bearing surface formed from a hard material (e.g., a diamond-based material, such as a polycrystalline diamond material), and a second member coupled to an input shaft to translate (e.g., rotate, slide, etc.) with respect to the first member. The second member has a second bearing surface formed from a hard material, and the second bearing surface is to bear against the first bearing surface. In embodiments of the disclosure, the first and second members can be for devices including, but not necessarily limited to: solenoids, generators and/or motors (Continued)

(e.g., out-runner radial flux generators, axial flux generators, radial flux generators/motors, roller vane motors, etc.), gearboxes, rotary data swivels, digital actuators, filters (e.g., inner rotating filters), valves (e.g., proportional valves), sensors (e.g., pressure differential sensors), and so forth.

20 Claims, 16 Drawing Sheets

Related U.S. Application Data

(60) Provisional application No. 62/042,894, filed on Aug. 28, 2014, provisional application No. 61/947,829, filed on Mar. 4, 2014.

(51) Int. Cl.
    *E21B 4/00*       (2006.01)
    *F16C 29/02*     (2006.01)
    *F16C 17/12*     (2006.01)
    *F16C 17/02*     (2006.01)

(52) U.S. Cl.
    CPC .............. *F16C 17/12* (2013.01); *F16C 29/02* (2013.01); *F16C 17/02* (2013.01); *F16C 2206/04* (2013.01); *F16C 2352/00* (2013.01); *F16C 2361/61* (2013.01); *F16C 2361/91* (2013.01); *F16C 2380/26* (2013.01)

(58) Field of Classification Search
    CPC .............. F16C 2361/91; F16C 2206/04; F16C 2352/00; F16C 17/02; E21B 4/006; E21B 4/003; E21B 41/00
    See application file for complete search history.

(56)                        References Cited

U.S. PATENT DOCUMENTS

| | | | |
|---|---|---|---|
| 4,029,368 A | 6/1977 | Tschirky et al. | |
| 4,729,440 A | 3/1988 | Hall | |
| 4,764,036 A * | 8/1988 | McPherson | E21B 4/003 175/320 |
| 5,209,577 A | 5/1993 | Swatek | |
| 5,520,255 A * | 5/1996 | Barr | E21B 4/003 175/24 |
| 9,062,713 B2 | 6/2015 | Braun et al. | |
| 10,030,704 B2 * | 7/2018 | Hall | E21B 41/00 |
| 2012/0257985 A1 | 10/2012 | Parmeter et al. | |
| 2013/0182982 A1 | 7/2013 | Dennis et al. | |
| 2013/0266247 A1 | 10/2013 | Watson | |
| 2014/0029877 A1 | 1/2014 | Kashchenevsky et al. | |

OTHER PUBLICATIONS

International Preliminary Report on Patentability issued in International Patent application PCT/US2012/018563, dated Sep. 6, 2016. 9 pages.

* cited by examiner

US 10,683,895 B2

SYSTEMS AND DEVICES USING HARD BEARINGS

RELATED APPLICATIONS

This application is a continuation of U.S. patent application Ser. No. 15/122,662, granted as U.S. Pat. No. 10,030,704, which is a national stage application of PCT/US2015/018563, filed Mar. 4, 2015, which claims priority to and the benefit of a U.S. Provisional Patent Application having Ser. No. 61/947,829, filed 4 Mar. 2014 and U.S. Provisional Patent Application having Ser. No. 62/042,894, filed 28 Aug. 2014, all of which are incorporated by reference in their entirety.

BACKGROUND

Oil wells are created by drilling a hole into the earth using a drilling rig that rotates a drill string (e.g., drill pipe) having a drill bit attached thereto. The drill bit, aided by the weight of pipes (e.g., drill collars) cuts into rock within the earth. Drilling fluid (e.g., mud) is pumped into the drill pipe and exits at the drill bit. The drilling fluid may be used to cool the bit, lift rock cuttings to the surface, at least partially prevent destabilization of the rock in the wellbore, and/or at least partially overcome the pressure of fluids inside the rock so that the fluids do not enter the wellbore.

SUMMARY

Aspects of the disclosure can relate to an apparatus including a first member having a first bearing surface formed from a hard material (e.g., a diamond-based material, such as a polycrystalline diamond material), and a second member coupled to an input shaft to translate (e.g., rotate, slide, etc.) with respect to the first member. The second member has a second bearing surface formed from a hard material, and the second bearing surface is to bear against the first bearing surface. In this manner, the first bearing surface and the second bearing surface define a clearance for filtering fluid flow therebetween. In embodiments of the disclosure, the first and second members can be for devices including, but not necessarily limited to: solenoids, generators and/or motors (e.g., out-runner radial flux generators, axial flux generators, radial flux generators/motors, roller vane motors, etc.), gearboxes, rotary data swivels, digital actuators, filters (e.g., inner rotating filters), valves (e.g., proportional valves), sensors (e.g., pressure differential sensors), and so forth.

Aspects of the disclosure can also relate to an apparatus including a first member having a first bearing surface and a second bearing surface formed from a hard material (e.g., a diamond-based material, such as a polycrystalline diamond material), and a second member coupled to an input shaft to translate (e.g., rotate, slide, etc.) with respect to the first member. The second member has a third bearing surface and a fourth bearing surface formed from a hard material. The third bearing surface is to bear against the first bearing surface, and the fourth bearing surface is to bear against the second bearing surface. In this manner, the first bearing surface and the third bearing surface, and/or the second bearing surface and the fourth bearing surface define a clearance for filtering fluid flow therebetween.

Aspects of the disclosure can further relate to an apparatus including a first member having a first bearing surface formed from a hard material (e.g., a diamond-based material, such as a polycrystalline diamond material), and a second member coupled to an input shaft to translate (e.g., rotate, slide, etc.) with respect to the first member. The second member has a second bearing surface formed from a hard material, and the second bearing surface is to bear against the first bearing surface. The apparatus also includes an O-ring coupled with the first member for decoupling the first member from the second member.

This summary is provided to introduce a selection of concepts that are further described below in the detailed description. This summary is not intended to identify key or essential features of the claimed subject matter, nor is it intended to be used as an aid in limiting the scope of the claimed subject matter.

FIGURES

Embodiments of systems and devices using hard bearings are described with reference to the following figures.

DETAILED DESCRIPTION

Figure 1:
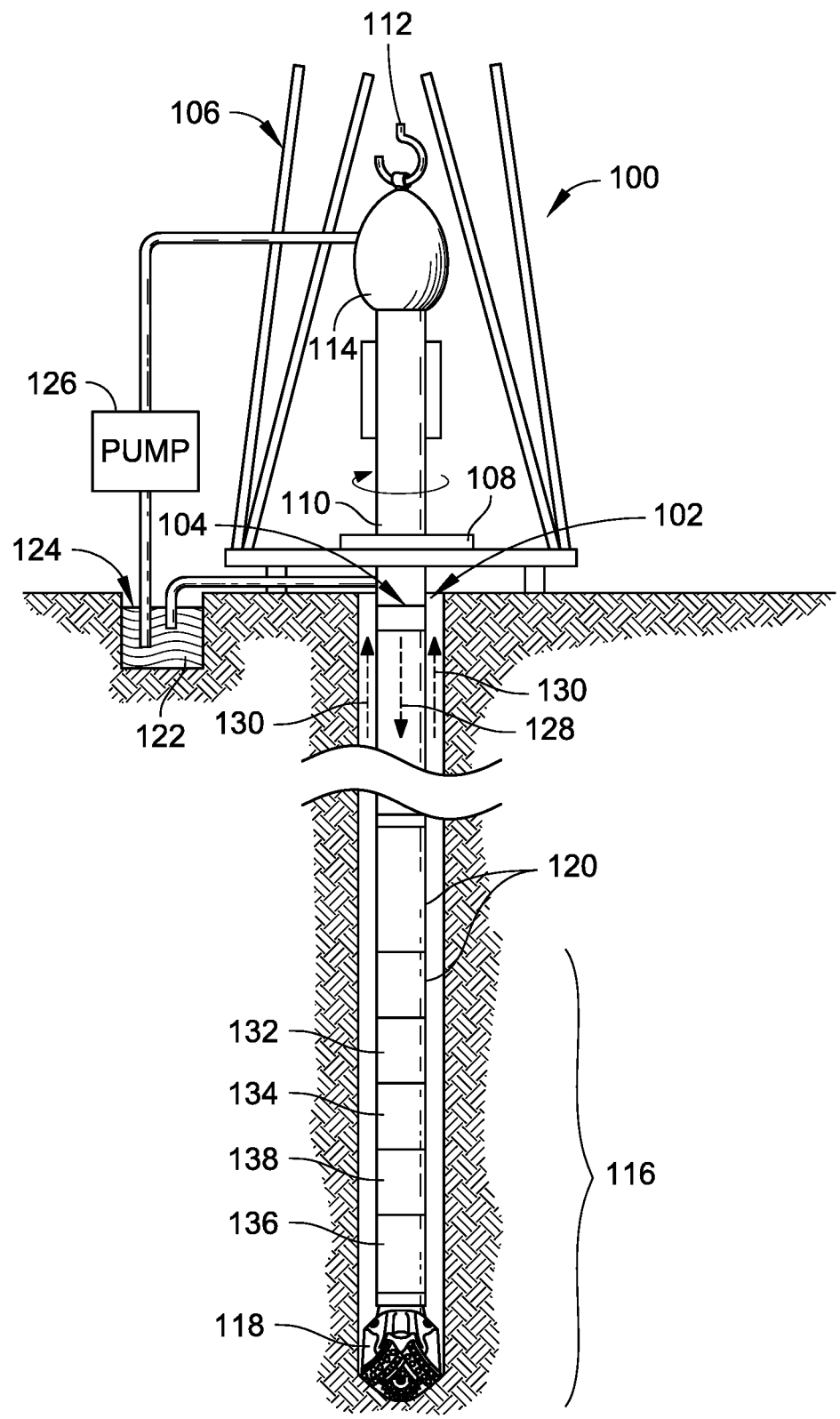
FIG. 1 illustrates an example system in which embodiments of systems and devices using hard bearings can be implemented.

Diamond (or other hard materials such as carbide or ceramic) journal bearings may see negligible wear for thousands of hours of operation in the worst environments (e.g., down hole drilling applications). Diamond also has very low friction. By placing a journal bearing on an inlet of a rotating device, the bearings can keep the environment free of particles larger than the clearance between the bearings. Since this clearance can be set based upon precision grinding and/or electrical discharge machining (EDM), the clearance can be very small, e.g., less than five ten-thousandths of an inch (0.0005 in.) (0.0127 mm) in some embodiments. However, this clearance is provided by way of example and is not meant to limit the present disclosure. In other embodiments, clearance between bearing surfaces can be less than one thousandth of an inch (0.001 in.) (0.0254 mm), greater than one thousandth of an inch (0.001 in.) (0.0254 mm), and so forth. In some embodiments, the clearance between adjacent bearing surfaces may be between about five ten-thousandths of an inch (0.0005 in.) (0.0127 mm) to about five thousandths of an inch (0.005 in.) (0.127 mm) (e.g., between about 0.0005 in., 0.001 in., 0.0015 in., 0.002 in., 0.0025 in., 0.003 in., 0.0035 in., 0.004 in., 0.0045 in., 0.005 in. (0.0127 mm, 0.0254 mm, 0.0381 mm, 0.0508 mm, 0.0635 mm, 0.0762 mm, 0.0889 mm, 0.1016 mm, 0.1143 mm, 0.127 mm) to about 0.0005 in., 0.001 in., 0.0015 in., 0.002 in., 0.0025 in., 0.003 in., 0.0035 in., 0.004 in., 0.0045 in., 0.005 in. (0.0127 mm, 0.0254 mm, 0.0381 mm, 0.0508 mm, 0.0635 mm, 0.0762 mm, 0.0889 mm, 0.1016 mm, 0.1143 mm, 0.127 mm)). Further, this small clearance can render particles that do enter the space between bearings harmless or at least comparatively harmless to mechanisms inside a device constructed using such bearings. Because this tight tolerance can be maintained and certain particles can be reduced or eliminated, surfaces within diamond journal bearings can be designed to be very close together (e.g., without the concern of wear from abrasive particles rubbing between a rotating and non-rotating surface, contacting surfaces, and so forth). Further, when a magnetic field is present, magnetic buildup may also be negated (e.g., due to small particle sizes). Thus, systems, apparatus, and techniques in accordance with the present disclosure can use hard bearings to achieve close tolerances, clean environments, and so forth.

Systems, devices, and techniques are described herein that employ a first member having a bearing surface formed from a hard material (e.g., a diamond-based material, such as a polycrystalline diamond material), and a second member coupled to an input shaft to translate (e.g., rotate, slide, etc.) with respect to the first member. In embodiments of the disclosure, the second member also has a second bearing surface formed from a hard material, which bears against the first bearing surface. In some embodiments, hard material bearings can be formed from a polycrystalline material. For example, diamond particles can be pressed together in a diamond press along with a catalyst (e.g., cobalt), and the resulting block can be shaped (e.g., ground, formed using EDM, etc.) into a bearing. However, diamond-based material is provided by way of example and is not meant to limit the present disclosure. For example, in other embodiments, tungsten carbide powder can be used (e.g., in place of or in addition to diamond-based materials).

In some embodiments, fluid for a protected environment on one side of diamond or hard bearings can be prevented from escaping due to the small clearance between the bearings. This effect can be enhanced by the use of a magnetostrictive fluid, e.g., where a magnetic field is present next to the bearing clearance. Some possible liquids that can be used with diamond or hard bearings include, but are not necessarily limited to: greases, silicons, oils, magnetostrictive fluids, drilling muds (e.g., without abrasive particles), other lubricants, and so on. In some embodiments, techniques in accordance with the present disclosure can be used to eliminate or reduce the need to encase a device in a housing and/or fill such a housing with oil. For example, some techniques used to protect mechanical-electrical devices in down hole drilling operations use a large oil reservoir that slowly leaks oil from a seal. The seal can wear out and fail, the oil can run out, and then the device may no longer operate. The seal can also introduce drag on a device, which can decrease the efficiency of such a device.

Systems, apparatus, and techniques of the present disclosure can be used with equipment including, but not necessarily limited to: generators, motors, solenoids, rotary swivels, gearboxes, rotary transducers, other rotary and/or linear devices, and so forth. Possible applications can include, but are not necessarily limited to: bio-medical applications (e.g., bearings for a heart pump without lubrication, such as when lubrication is not possible and/or where replacement of bearings is not desirable), applications that use abrasive chemicals, applications that use aggressive chemicals, and so on. In some embodiments, the systems, apparatus, and techniques described herein can be used with oil well equipment, such as equipment used in a well site system.

FIG. 1 depicts a wellsite system 100 in accordance with one or more embodiments of the present disclosure. The wellsite can be onshore or offshore. A borehole 102 is formed in subsurface formations by directional drilling. A drill string 104 extends from a drill rig 106 and is suspended within the borehole 102. In some embodiments, the wellsite system 100 implements directional drilling using a rotary steerable system (RSS). For instance, the drill string 104 is rotated from the surface, and down-hole devices move the end of the drill string 104 in a desired direction. The drill rig 106 includes a platform and derrick assembly positioned over the borehole 102. In some embodiments, the drill rig 106 includes a rotary table 108, kelly 110, hook 112, rotary swivel 114, and so forth. For example, the drill string 104 is rotated by the rotary table 108, which engages the kelly 110 at the upper end of the drill string 104. The drill string 104 is suspended from the hook 112 using the rotary swivel 114, which permits rotation of the drill string 104 relative to the hook 112. However, this configuration is provided by way of example and is not meant to limit the present disclosure. For instance, in other embodiments a top drive system is used.

A bottom hole assembly (BHA) 116 is suspended at the end of the drill string 104. The bottom hole assembly 116 includes a drill bit 118 at its lower end. In embodiments of the disclosure, the drill string 104 includes a number of drill pipes 120 that extend the bottom hole assembly 116 and the drill bit 118 into subterranean formations. Drilling fluid (e.g., mud) 122 is stored in a tank and/or a pit 124 formed at the wellsite. The drilling fluid 122 can be water-based, oil-based, and so on. A pump 126 displaces the drilling fluid 122 to an interior passage of the drill string 104 via, for example, a port in the rotary swivel 114, causing the drilling fluid 122 to flow downwardly through the drill string 104 as indicated by directional arrow 128. The drilling fluid 122 exits the drill string 104 via ports (e.g., courses, nozzles) in the drill bit 118, and then circulates upwardly through the annulus region between the outside of the drill string 104 and the wall of the borehole 102, as indicated by directional arrows 130. In this manner, the drilling fluid 122 cools and lubricates the drill bit 118 and carries drill cuttings generated by the drill bit 118 up to the surface (e.g., as the drilling fluid 122 is returned to the pit 124 for recirculation). Further, destabilization of the rock in the wellbore can be at least partially prevented, the pressure of fluids inside the rock can be at least partially overcome so that the fluids do not enter the wellbore, and so forth.

In embodiments of the disclosure, the drill bit 118 comprises one or more crushing and/or cutting implements, such as conical cutters and/or bit cones having spiked teeth (e.g., in the manner of a roller-cone bit). In this configuration, as the drill string 104 is rotated, the bit cones roll along the bottom of the borehole 102 in a circular motion. As they roll, new teeth come in contact with the bottom of the borehole 102, crushing the rock immediately below and around the bit tooth. As the cone continues to roll, the tooth then lifts off the bottom of the hole and a high-velocity drilling fluid jet strikes the crushed rock chips to remove them from the bottom of the borehole 102 and up the annulus. As this occurs, another tooth makes contact with the bottom of the borehole 102 and creates new rock chips. In this manner, the process of chipping the rock and removing the small rock chips with the fluid jets is continuous. The teeth intermesh on the cones, which helps clean the cones and enables larger teeth to be used. A drill bit 118 comprising a conical cutter can be implemented as a steel milled-tooth bit, a carbide insert bit, and so forth. However, roller-cone bits are provided by way of example and are not meant to limit the present disclosure. In other embodiments, a drill bit 118 is arranged differently. For example, the body of the drill bit 118 comprises one or more polycrystalline diamond compact (PDC) cutters that shear rock with a continuous scraping motion.

In some embodiments, the bottom hole assembly 116 includes a logging-while-drilling (LWD) module 132, a measuring-while-drilling (MWD) module 134, a rotary steerable system 136, a motor, and so forth (e.g., in addition to the drill bit 118). The logging-while-drilling module 132 can be housed in a drill collar and can contain one or a number of logging tools. It should also be noted that more than one LWD module and/or MWD module can be employed (e.g. as represented by another logging-while-drilling module 138). In embodiments of the disclosure, the logging-while drilling modules 132 and/or 138 include capabilities for measuring, processing, and storing information, as well as for communicating with surface equipment, and so forth.

The measuring-while-drilling module 134 can also be housed in a drill collar, and can contain one or more devices for measuring characteristics of the drill string 104 and drill bit 118. The measuring-while-drilling module 134 can also include components for generating electrical power for the down-hole equipment. This can include a mud turbine generator (also referred to as a "mud motor") powered by the flow of the drilling fluid 122. However, this configuration is provided by way of example and is not meant to limit the present disclosure. In other embodiments, other power and/or battery systems can be employed. The measuring-while-drilling module 134 can include one or more of the following measuring devices: a weight-on-bit measuring device, a torque measuring device, a vibration measuring device, a shock measuring device, a stick slip measuring device, a direction measuring device, an inclination measuring device, and so on.

In some embodiments, the wellsite system 100 is used with controlled steering or directional drilling. For example, the rotary steerable system 136 is used for directional drilling. As used herein, the term "directional drilling" describes intentional deviation of the wellbore from the path it would naturally take. Thus, directional drilling refers to steering the drill string 104 so that it travels in a desired direction. In some embodiments, directional drilling is used for offshore drilling (e.g., where multiple wells are drilled from a single platform). In other embodiments, directional drilling enables horizontal drilling through a reservoir, which enables a longer length of the wellbore to traverse the reservoir, increasing the production rate from the well. Further, directional drilling may be used in vertical drilling operations. For example, the drill bit 118 may veer off of a planned drilling trajectory because of the unpredictable nature of the formations being penetrated or the varying forces that the drill bit 118 experiences. When such deviation occurs, the wellsite system 100 may be used to guide the drill bit 118 back on course.

The drill string 104 can include one or more extendable displacement mechanisms, such as a piston mechanism that can be selectively actuated by an actuator to displace a pad toward, for instance, a borehole wall to cause the bottom hole assembly 116 to move in a desired direction of deviation. In embodiments of the disclosure, a displacement mechanism can be actuated by the drilling fluid 122 routed through the drill string 104. For example, the drilling fluid 122 is used to move a piston, which changes the orientation of the drill bit 118 (e.g., changing the drilling axis orientation with respect to a longitudinal axis of the bottom hole assembly 116). The displacement mechanism may be employed to control a directional bias and/or an axial orientation of the bottom hole assembly 116. Displacement mechanisms may be arranged, for example, to point the drill bit 118 and/or to push the drill bit 118. In some embodiments, a displacement mechanism is deployed by a drilling system using a rotary steerable system 136 that rotates with a number of displacement mechanisms. It should be noted that the rotary steerable system 136 can be used in conjunction with stabilizers, such as non-rotating stabilizers, and so on.

In some embodiments, a displacement mechanism can be positioned proximate to the drill bit 118. However, in other embodiments, a displacement mechanism can be positioned at various locations along a drill string, a bottom hole assembly, and so on. For example, in some embodiments, a displacement mechanism is positioned in a rotary steerable system 136, while in other embodiments, a displacement mechanism can be positioned at or near the end of the bottom hole assembly 116 (e.g., proximate to the drill bit 118). In some embodiments, the drill string 104 can include one or more filters that filter the drilling fluid 122 (e.g., upstream of the displacement mechanism with respect to the flow of the drilling fluid 122).

Figure 2:
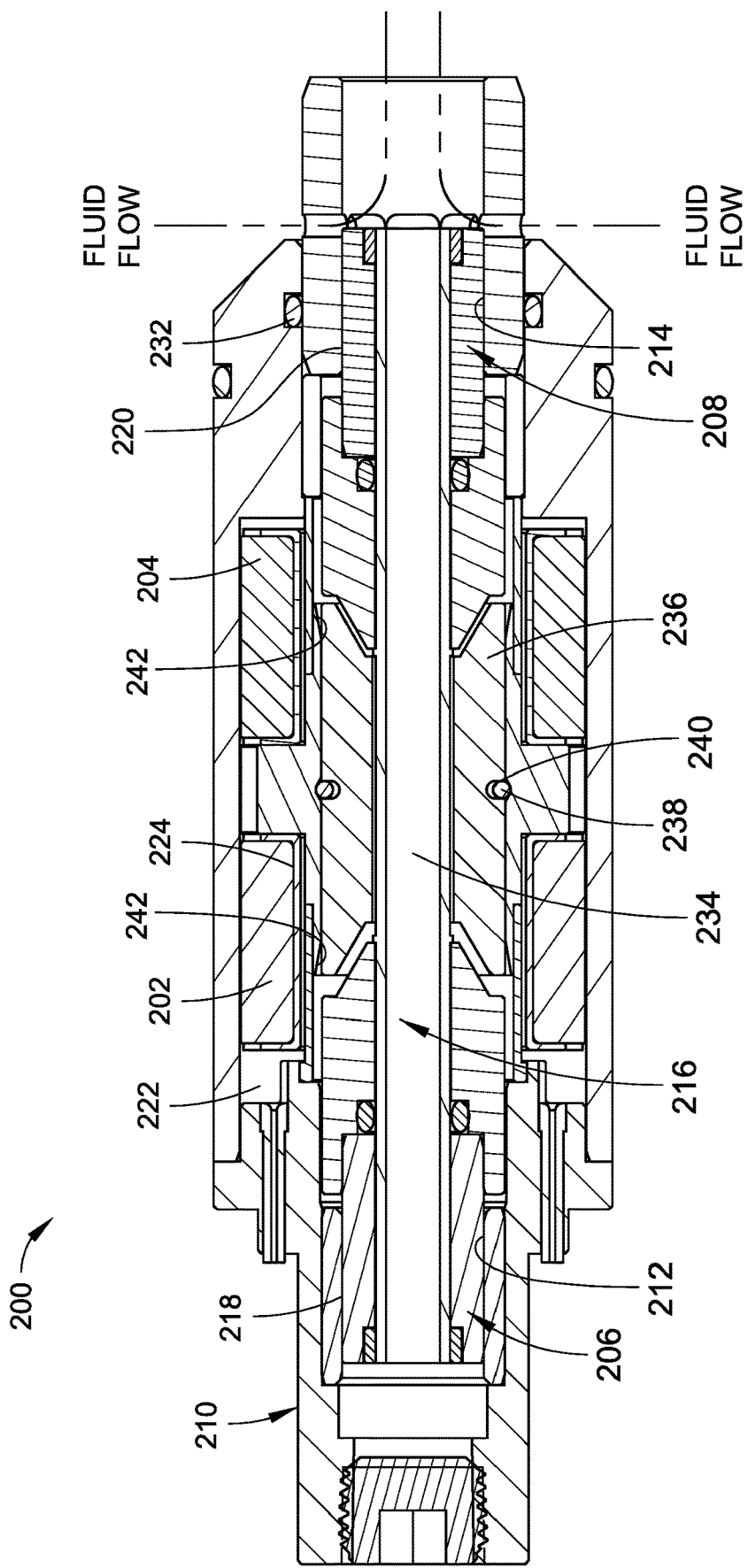
FIG. 2 illustrates an example apparatus implementing a dual solenoid to control a valve in accordance with one or more embodiments, where the valve is shown in an open configuration.
Figure 3:
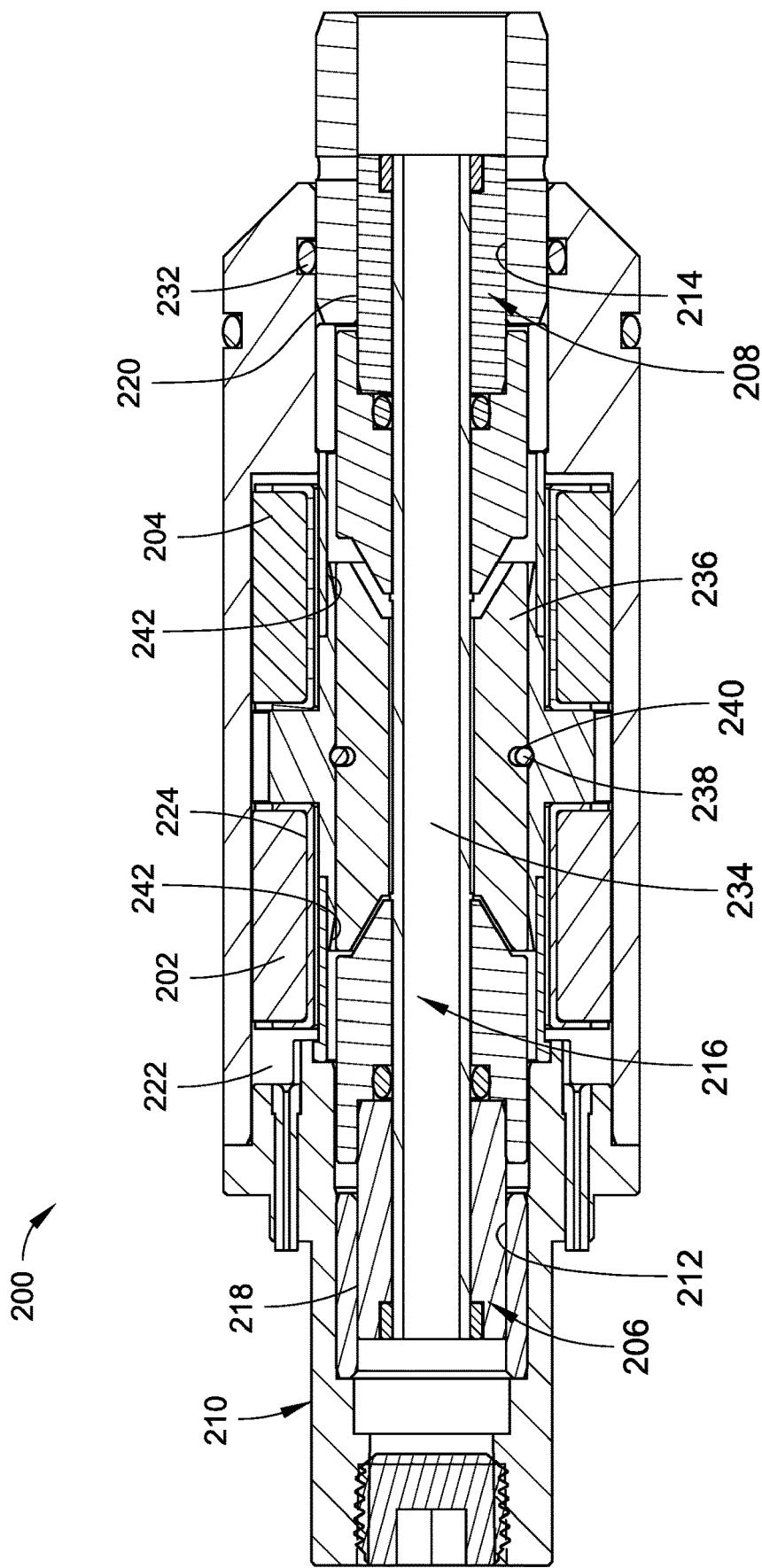
FIG. 3 is another illustration of the example apparatus of FIG. 2, where the valve is shown in a closed configuration.
Figure 4:
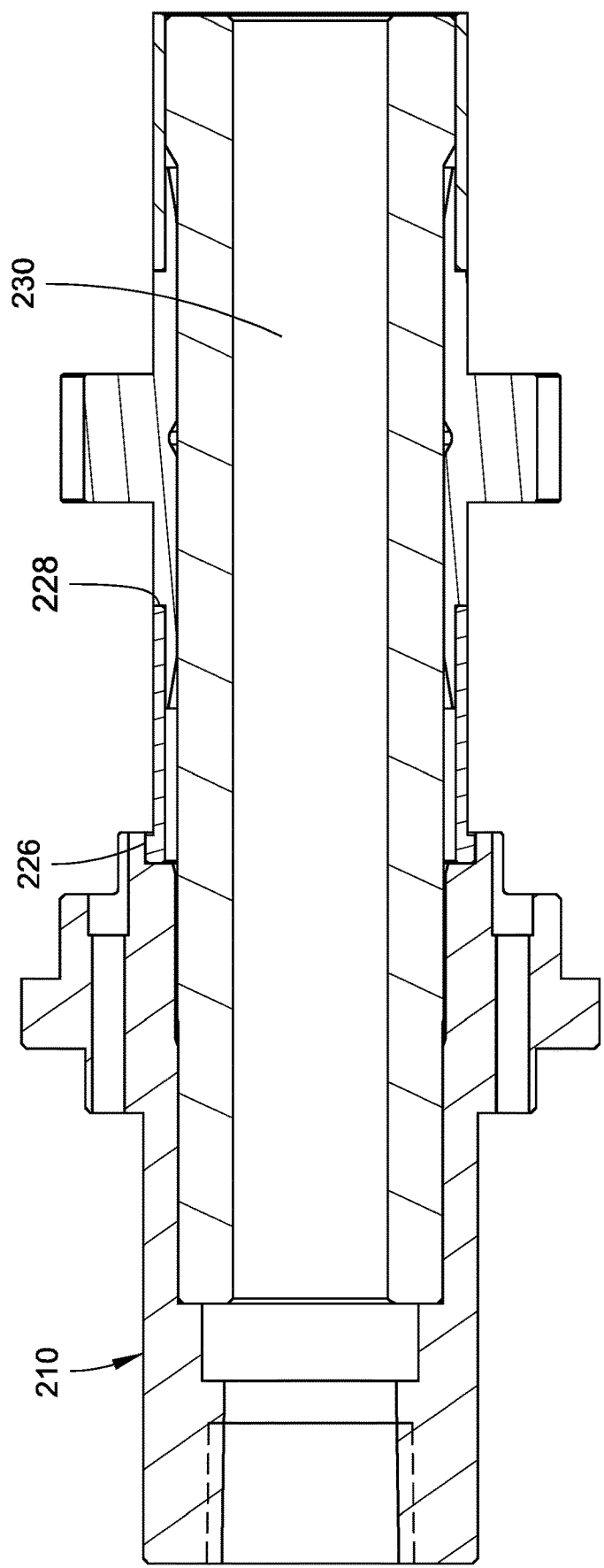
FIG. 4 is another illustration of the example apparatus of FIG. 2, where a spacer is used while connecting (e.g., welding) components to provide concentric parts.

Referring now to FIGS. 2 through 16, example systems and devices that use one or more bearings formed of diamond material and/or one or more other hard materials (e.g., carbide, ceramic, and so on) are described. With reference to FIGS. 2 through 4, a solenoid device 200 is described that uses solenoid windings 202 and 204 to open and close a valve. The solenoid device 200 also includes a bearing 206 and a bearing 208. For example, a stator 210 of the solenoid device 200 includes bearing surfaces 212 and 214 formed from a hard material (e.g., a diamond-based material, such as a polycrystalline diamond material). An armature (e.g., a plunger 216) that translates with respect to the stator 210 includes bearing surfaces 218 and 220 formed from hard material, which bear against the bearing surfaces 212 and 214, respectively. The bearing 208 can be used as the inner part of the valve to port a fluid, such as drilling mud (e.g., with reference to FIG. 1). As described, because the pressure is exerted in a balanced way from outside the solenoid device 200 to inside the device, the valve can be operated to open and close with comparatively little force. Because the clearance between the moving parts and the stationary parts of the solenoid device 200 may directly affect the force generated, a tighter clearance can be maintained, and the solenoid device 200 can be more efficient. Further, the bearings 206 and 208 can limit particles from entering into the region between the plunger 216 and stator 210 based upon the tight clearances. By limiting the size of the particles, the clearance in the solenoid device 200 can be very small, and the solenoid may be more efficient (e.g., with respect to a solenoid not having such tight clearances).

In some embodiments, both bearings 206 and 208 may have the same diameter, or at least substantially the same diameter, and the fluid volume between the two bearings 206 and 208 may not change due to the opening and closing of the valve. This fixed volume can be filled with a liquid selected for solenoid operations. Because of the fixed volume, there may also be minimal or no resistance from fluid being forced into the tight gap between the bearings 206 and 208. In some implementations, moving parts of a solenoid may strike nonmoving parts. In the embodiments described herein, fluid trapped between the bearings may act as a fluid damper as a moving surface approaches a nonmoving surface (e.g., at the end of a stroke).

In some embodiments, the solenoid windings 202 and 204 can be exposed to pressures of up to about thirty thousand pounds-per-square inch (30,000 psi) down hole. Thus, a casing around the solenoid windings 202 and 204 can be connected (e.g., welded) together and filled with a filler material (e.g., potting 222). For instance, a sleeve 224 of non-magnetic material can be welded between the magnetic materials at weld joints 226 and 228 (e.g., so that the magnetic effect, which moves the solenoid, is not shorted between the materials). The potting 222 can support the non-magnetic sleeve 224, which may be formed using a thin metal material, so that it does not deform, or undergoes at least substantially limited deformation, due to the high pressure experienced by the solenoid device 200. In some embodiments, potting can also be used to seal one or more wires that exit the solenoid into a pressure vessel, which may eliminate or reduce the use of a bulk head connector in some embodiments.

Generally, when a solenoid body is formed using multiple components, the concentricity of the two outer bearings may be limited. However, as described with reference to FIG. 4, a very tight spacer 230 can be used while connecting (e.g., welding at weld joints 226 and 228) the components to provide concentric parts. Further, a gasket (e.g., an O-ring 232) can be disposed around one or more of the outer bearings, which can decouple the bearing or bearings and allow them to float a small amount. In some embodiments, a small diameter flexible tube 234 can be used to attach one side of the moving element to the other. As described herein, the tube 234 can be formed using a flexible material, such as titanium, plastic, or one or more other flexible materials, which may reduce or eliminate concentricity issues.

In other embodiments, components of bearings described herein are fixedly connected to a rigid input shaft, such as a steel shaft. For example, a component having a bearing surface formed from a hard material is affixed to a steel shaft using a glue, an adhesive (e.g., a cyanoacrylate adhesive), PEEK melted and bonded to the shaft, a resin, and so forth. In some embodiments, the steel shaft can be prepared to accept a bonding material. For example, the steel shaft can be plated with another metal, such as gold.

In some embodiments, moving parts that are serviced or replaced can be installed from one end of the solenoid device 200. This configuration can facilitate easier and/or more efficient serviceability, and may also allow a pressure vessel where electronics are installed to remain undisturbed, or at least substantially undisturbed, during servicing. For example, a central non-moving part 236 of the solenoid device 200 can include an inner mechanism and an outer mechanism. The non-moving part 236 can be installed with the moving parts (e.g., tube 234, bearings 206 and/or 208, etc.) and may have a securing mechanism (e.g., a round snap ring 238) that secures the non-moving part 236 in place (e.g., once the removable parts are installed). The snap ring 238 can be configured so that more force is used to remove the snap ring 238 than the solenoid device 200 generates during operation. This configuration can be implemented using ramps. For example, a ramp 240 can be positioned proximate to a groove that receives the round snap ring 238. In some embodiments, a tool can be used to remove the removable parts, where the tool is configured to generate enough force to collapse the ring using the ramp 240 to remove the assembly. Further, one or more ramps 242 can also be included to facilitate insertion of the snap ring 238.

In some embodiments, an apparatus using diamond and/or hard material bearings can be implemented as a motor and/or a generator. Generally, the performance of motors and generators can be related to how closely the rotating magnetic field of a rotor is to a stator. For example, power may decrease exponentially with gap size (e.g., due to low permeability of ambient air, a fluid gap between the rotor and the stator, and so on). In an abrasive environment, such as down hole in a drilling operation, the gap between a rotor and a stator may be determined based upon particle sizes present between the rotating and stationary surfaces. By using, for example, diamond bearings as a filter to eliminate particles above a certain particle size from entering a very small gap, the particles that do enter the gap may be small enough that their impact on the rotor and/or stator components may be minimal. This configuration can allow rotating surface to be much closer to stationary surfaces, and thus the efficiency of a motor and/or generator can be increased.

Further, it may be desirable to use a larger separation between a rotor and a stator when windings are isolated from a conductive fluid (e.g., to prevent electrical shorting between the components). As described herein, a thin sheet of metal can be used to protect the stationary portion of the device. In this configuration, one or more inside voids can be filled with a filler material, such as potting, to support the thin sheet of metal (e.g., preventing the sheet from collapsing under pressure). In some embodiments, a thin sheet of metal can be made even thinner, e.g., when there are no large particles present to wear through it. Further, as described herein, such a sheet may not necessarily be used with example motors and/or generators of the present disclosure. This configuration can also decrease the gap between rotating and stationary components of the device. In some embodiments, example motors and/or generators described do not necessarily use a rotary seal and/or an oil reservoir. For example, in some embodiments, a motor and/or a generator using diamond or hard bearings operates in drilling mud.

Figure 5:
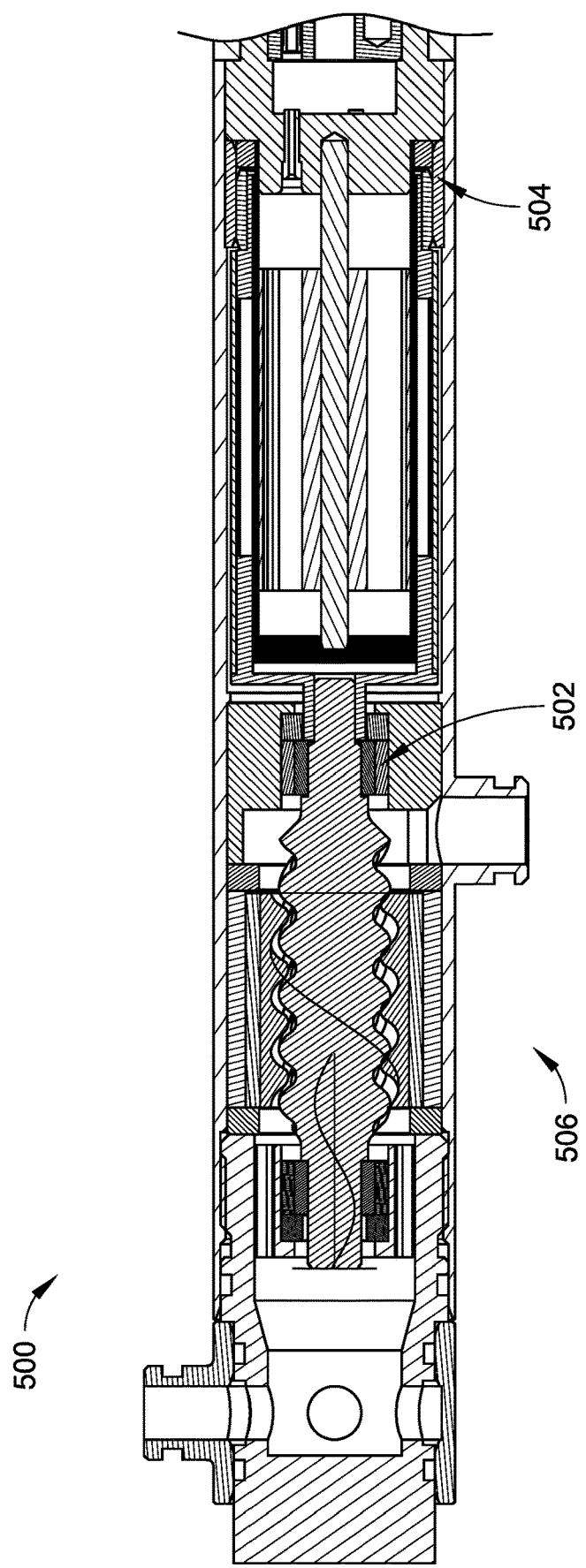
FIG. 5 illustrates an example apparatus implementing an out-runner radial flux generator in accordance with one or more embodiments.

With reference to FIG. 5, an out-runner radial flux generator 500 is described. The generator 500 can have diamond or hard journal bearings 502 and/or 504 on either or both sides of the generator 500. As shown in the accompanying figure, side 506 of the generator 500 can be a possible inlet for particles, and the bearings 502 and 504 can limit the size of these particles so that a thin sheet of metal can be very thin or removed altogether, allowing magnets of the generator 500 to be much closer to the laminations and increasing the power output of the generator 500.

Figure 6:
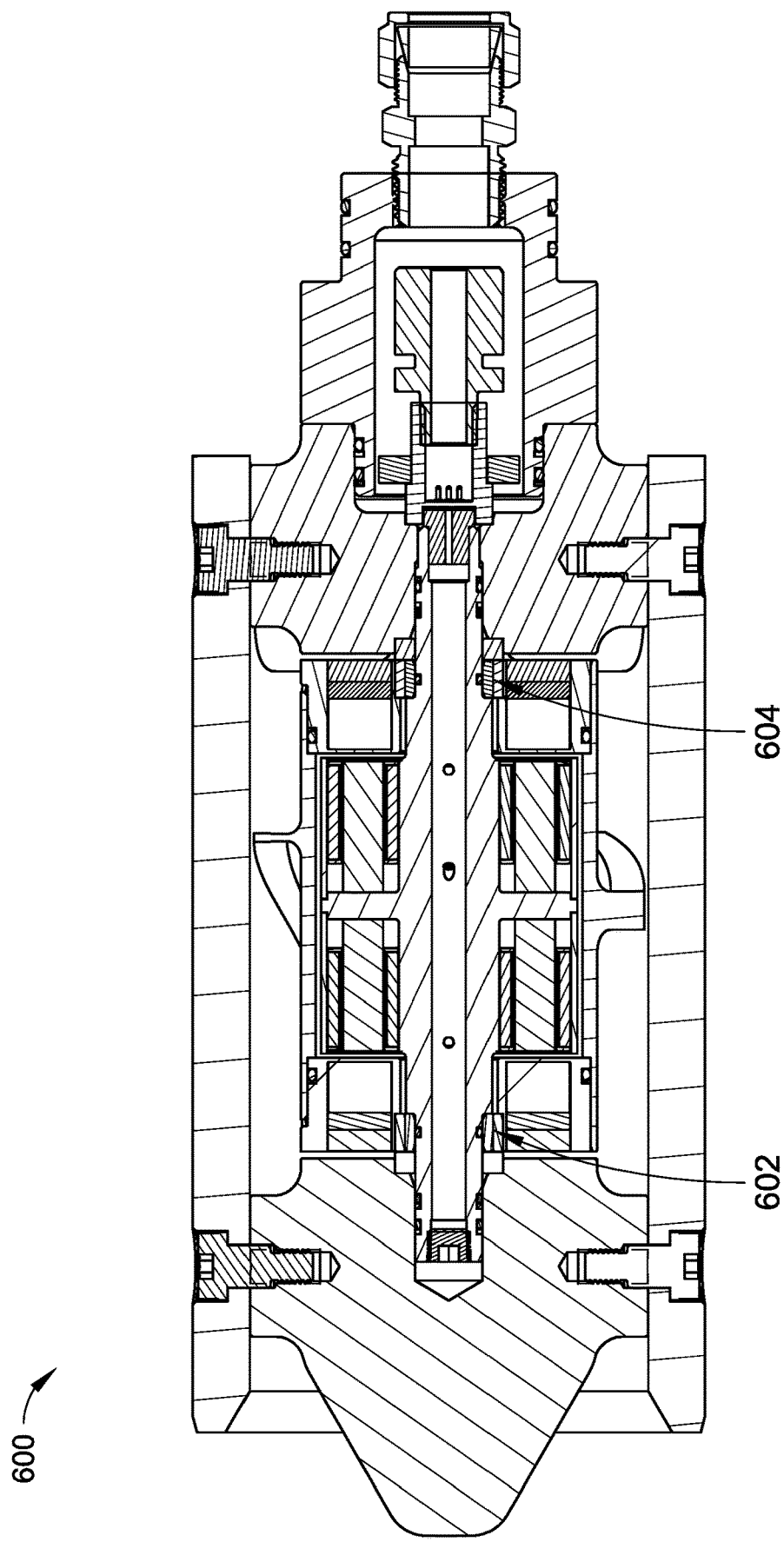
FIG. 6 illustrates an example apparatus implementing an axial flux generator in accordance with one or more embodiments.

With reference to FIG. 6, an axial flux generator 600 is described. The generator 600 can have diamond or hard journal bearings 602 and/or 604 on either or both sides of the generator 600. In this configuration, both sides of the bearings 602 and 604 may be possible inlets for particles, and the bearings 602 and 604 can limit the size of the particles, allowing the magnets to be much closer to the laminations and increasing the power output of the generator 600.

Figure 7:
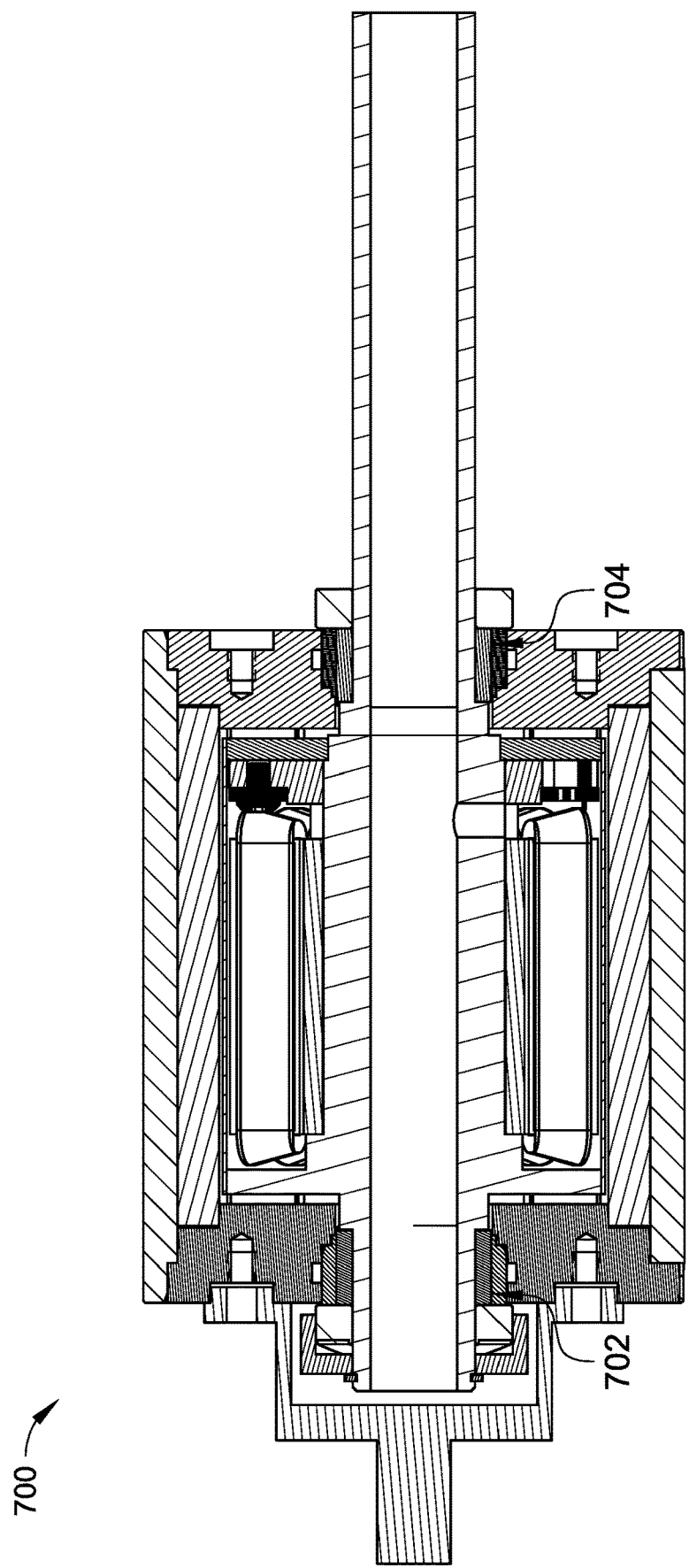
FIG. 7 illustrates an example apparatus implementing a radial flux generator/motor in accordance with one or more embodiments.

With reference to FIG. 7, a radial flux generator and/or motor 700 is described. The generator/motor 700 can have diamond or hard journal bearings 702 and/or 704 on either or both sides of the generator 700. In this configuration, both sides of the bearings 702 and 704 can be possible inlets for particles, and the bearings 702 and 704 can limit the size of the particles, allowing the magnets can be much closer to the laminations and increasing the power output of the generator.

Figure 8:
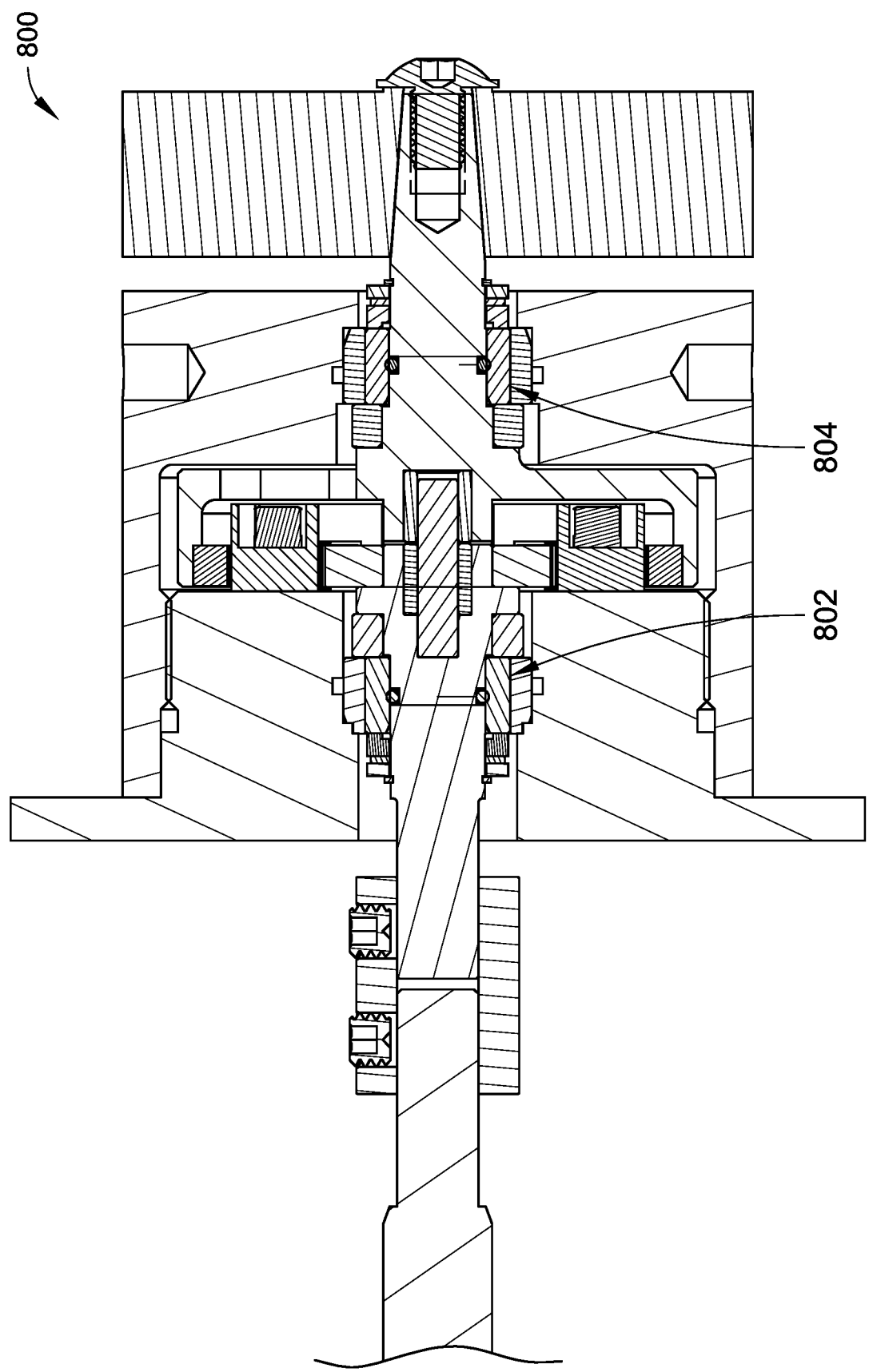
FIG. 8 illustrates an example apparatus implementing a gearbox in accordance with one or more embodiments.

With reference to FIG. 8, a gearbox 800 is described. The gearbox 800 can have diamond or hard journal bearings 802 and/or 804 on either or both sides of the gears. In this configuration, both sides of the gears can be possible inlets for particles, and the bearings 802 and 804 can limit the size of the particles to prevent or reduce large particles that may otherwise be caught between gears, possibly wearing the gears more quickly. In some implementations, a two-to-one (2:1) gear reduction can be used to reverse a direction of motion (e.g., while maintaining an in-line axis). For example, the position of the planet gears can be fixed with respect to the housing, allowing the sun and ring gears to rotate.

In some embodiments, one or more of the gears in the gearbox 800 can be constructed from diamond and/or one or more other hard materials (e.g., carbide) to withstand particle impacts from materials entering the gearbox 800 (e.g., drilling mud). Further, in some embodiments, one or more additional particle-based materials can be added to the gearbox 800 (e.g., in the manner of a thickener used with a lubricant pack for the gearbox 800). For example, the gearbox 800 can be pre-packed prior to deployment with a mix of lubricating particles (e.g., polytetrafluoroethylene (PTFE) power and/or beads) and a suitable carrier fluid, such as gear oil, grease, water, alcohol, gel, non-abrasive drilling mud, and so on. However, PTFE is provided by way of example and is not meant to limit the present disclosure. In other embodiments, polyether ether ketone (PEEK) powder and/or beads can be used. In this configuration, a mud stream entering the gear box can then be mixed into the existing lubricant pack. As described herein, diameters of these lubricating particles can be larger than the largest diameter of drilling mud particles as filtered by the diamond or hard bearings described herein. In this manner, the gears may impact these particles rather than the largest particles of drilling mud.

Figure 9:
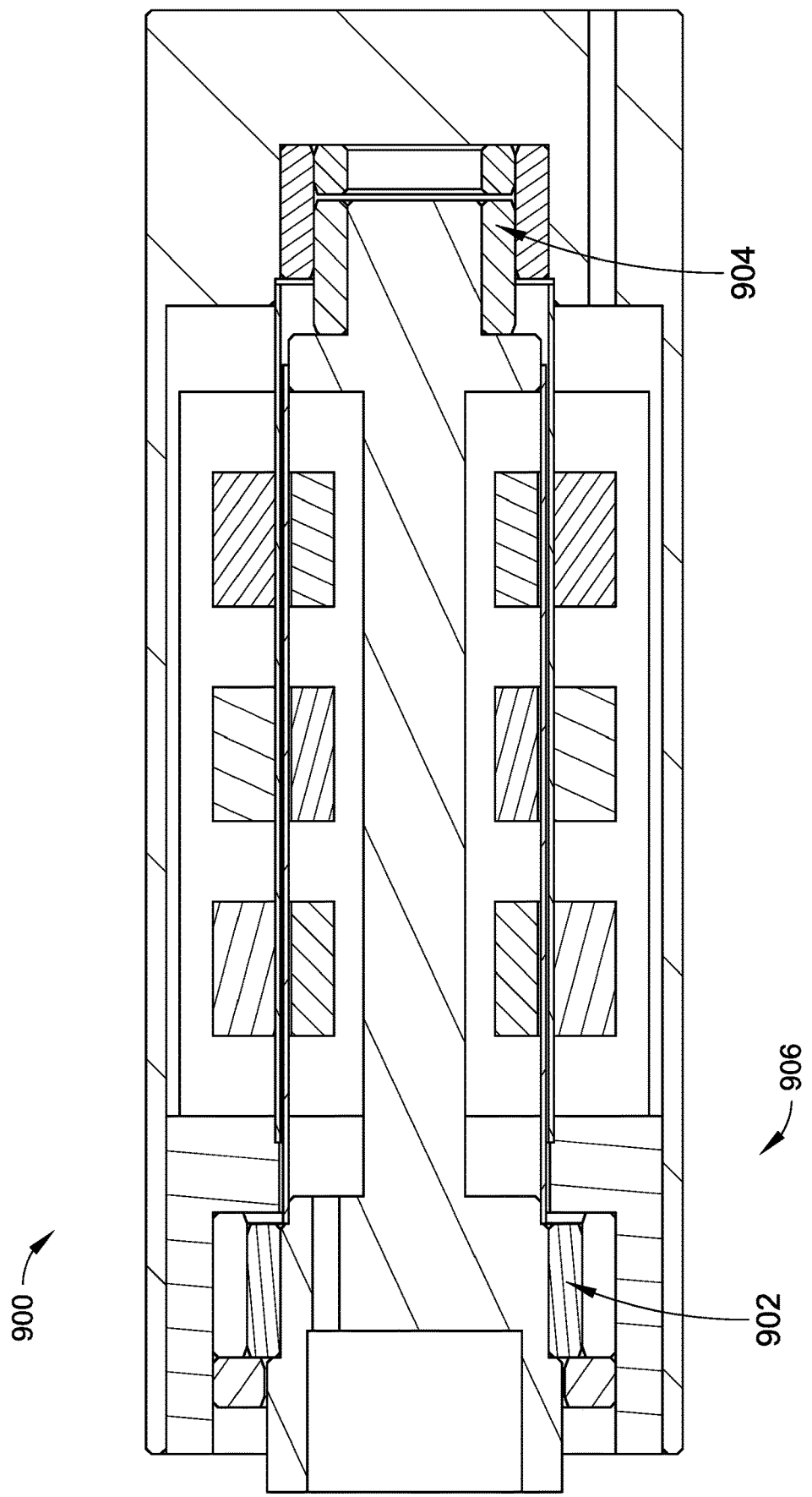
FIG. 9 illustrates an example apparatus implementing a rotary data swivel in accordance with one or more embodiments.

With reference to FIG. 9, a rotary data swivel 900 is described. The data swivel 900 can have diamond or hard journal bearings 902 and/or 904 on either or both sides of the coils. As shown in the accompanying figures, side 906 of the coils can be a possible inlet for particles, and the bearings 902 and 904 can limit the size of the particles, allowing the two magnetic concentrators around the wire coils to be much closer to one another and increasing the signal input of the receiving coils. In some embodiments, thin metal protective tubes on the inner and/or outer portions of the swivel can be removed (e.g., to decrease the gap further).

It should be noted that while the present disclosure has described devices that use bearings formed of diamond material and/or one or more other hard materials with some specificity, other devices can also use such bearings, including, but not necessarily limited to: sensors and transducers that use a clean environment to operate and/or rotate or move linearly, electronics that are otherwise potted (e.g., the coils in a generator and/or motor, integrated circuit chips, and so on), components that are isolated from mud and large particles but can otherwise survive high pressure (e.g., without a pressure housing), and so forth.

Figure 10:
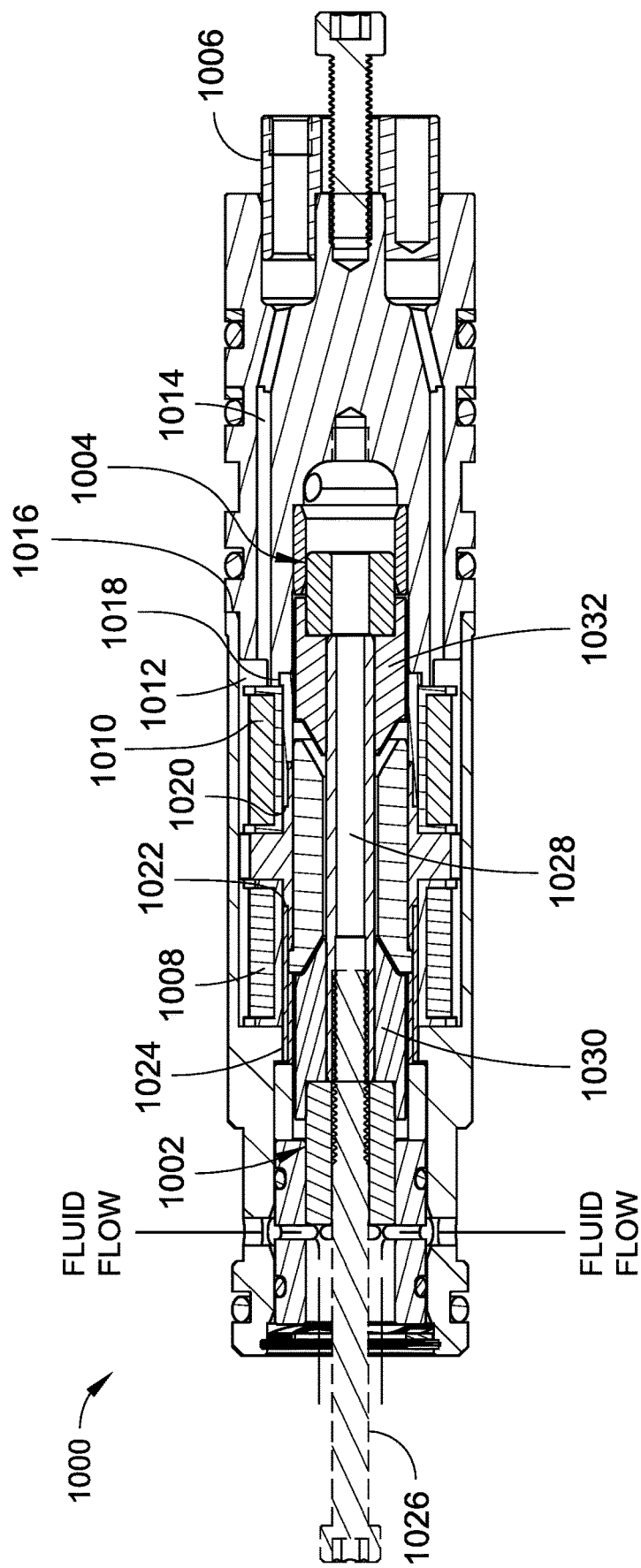
FIG. 10 illustrates an example apparatus implementing a digital actuator in accordance with one or more embodiments.

Referring now to FIGS. 10 through 16, devices are described that use one or more bearings formed of diamond material and/or one or more other hard materials (e.g., carbide, ceramic, and so on) to implement filter systems. With reference to FIG. 10, a digital actuator 1000 is described. The digital actuator 1000 uses a diamond or other hard material valve and bearing 1002 to filter particles that enter through a tight gap between diamond or other hard material parts. In some embodiments, the size of particles that enter the gap can be limited to less than between about two one-thousandths of an inch (0.002 in.) (0.0508 mm) and three one-thousandths of an inch (0.003 in.) (0.0762 mm). However, these particle sizes are provided by way of example and are not meant to limit the present disclosure. In other embodiments, the bearing can be used to allow particles having sizes less than about two one-thousandths of an inch (0.002 in.) (0.0508 mm), greater than about three one-thousandths of an inch (0.003 in.) (0.0762 mm), and so forth. The digital actuator 1000 can also include a diamond or other hard material bearing 1004, a connector block 1006 (e.g., formed of PEEK and/or another polymer material), solenoid windings 1008 and 1010, potting 1012, one or more cavities for wire routing 1014, and so forth.

In some embodiments, the digital actuator 1000 can employ a welded stator. For example, E-beam weld joints 1016, 1018, 1020, 1022, and/or 1024 can be used to isolate the windings from the mud, and potting 1012 can be used to allow thin walls to withstand the pressure. In some embodiments, the bearings 1002 and/or 1004 can be press-fit into the device. In such implementations, an outer bearing may be machined out (e.g., to salvage internal mechanisms). In embodiments of the disclosure, the digital actuator 1000 may include removable and/or serviceable parts (e.g., employing a snap ring with inner parts that can be removed with a bolt 1026 that can be threaded into an inner tube 1028). The inner tube 1028 and the bearings 1002 and/or 1004 can be press-fit into receivers 1030 and/or 1032.

Figure 11:
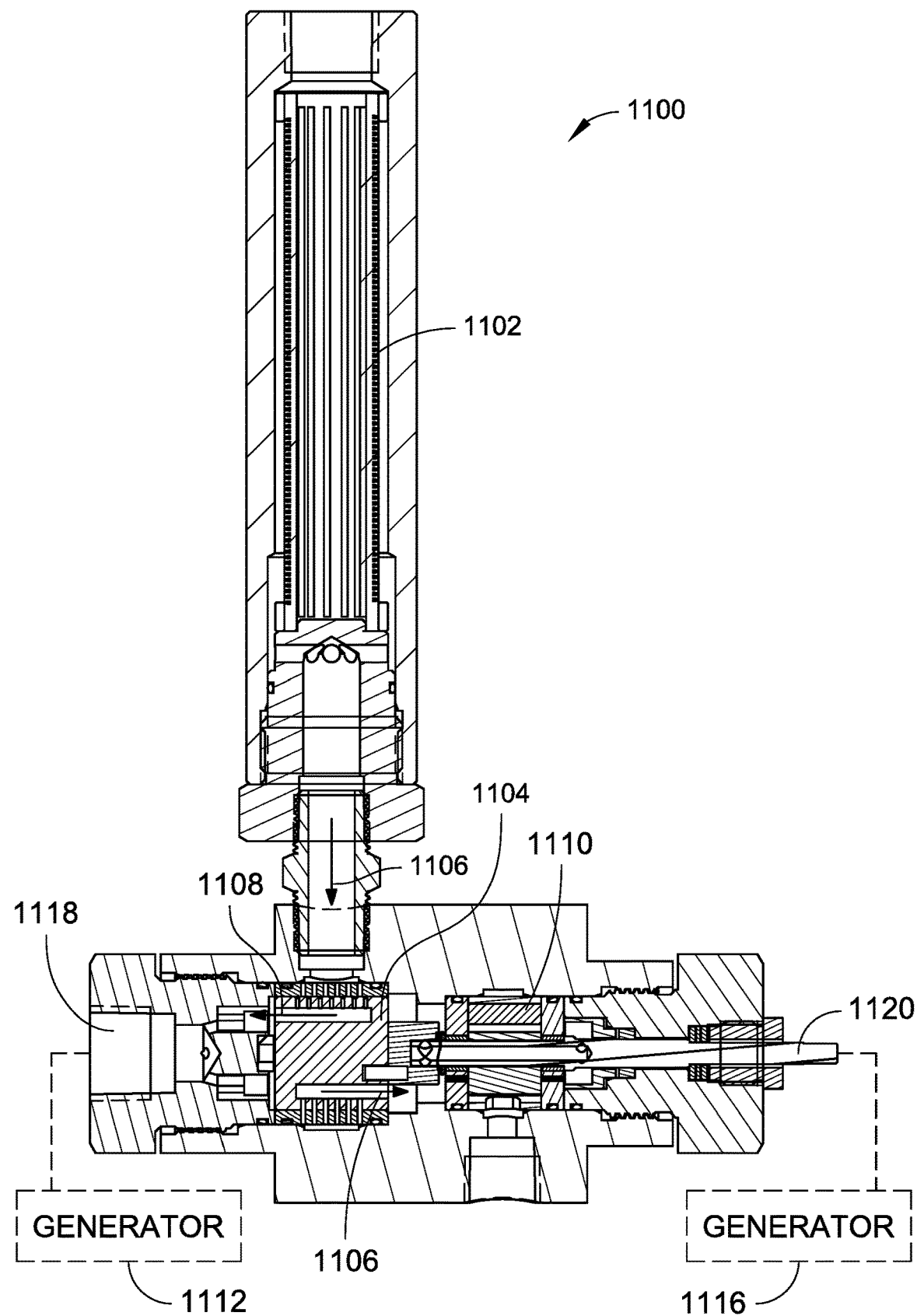
FIG. 11 illustrates an example apparatus implementing an inner rotating filter in accordance with one or more embodiments.
Figure 12:
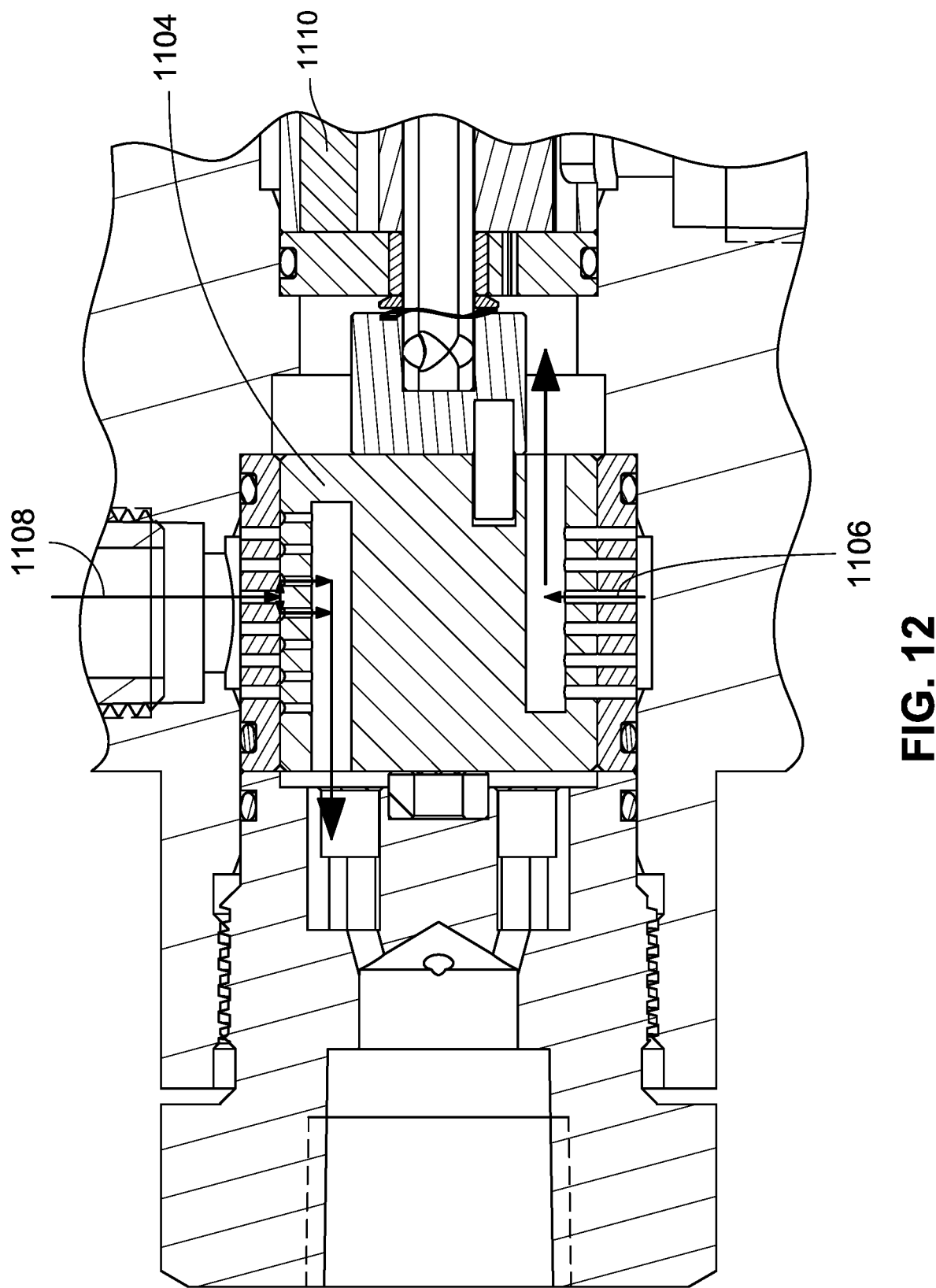
FIG. 12 is another illustration of the example apparatus of FIG. 11.
Figure 13:
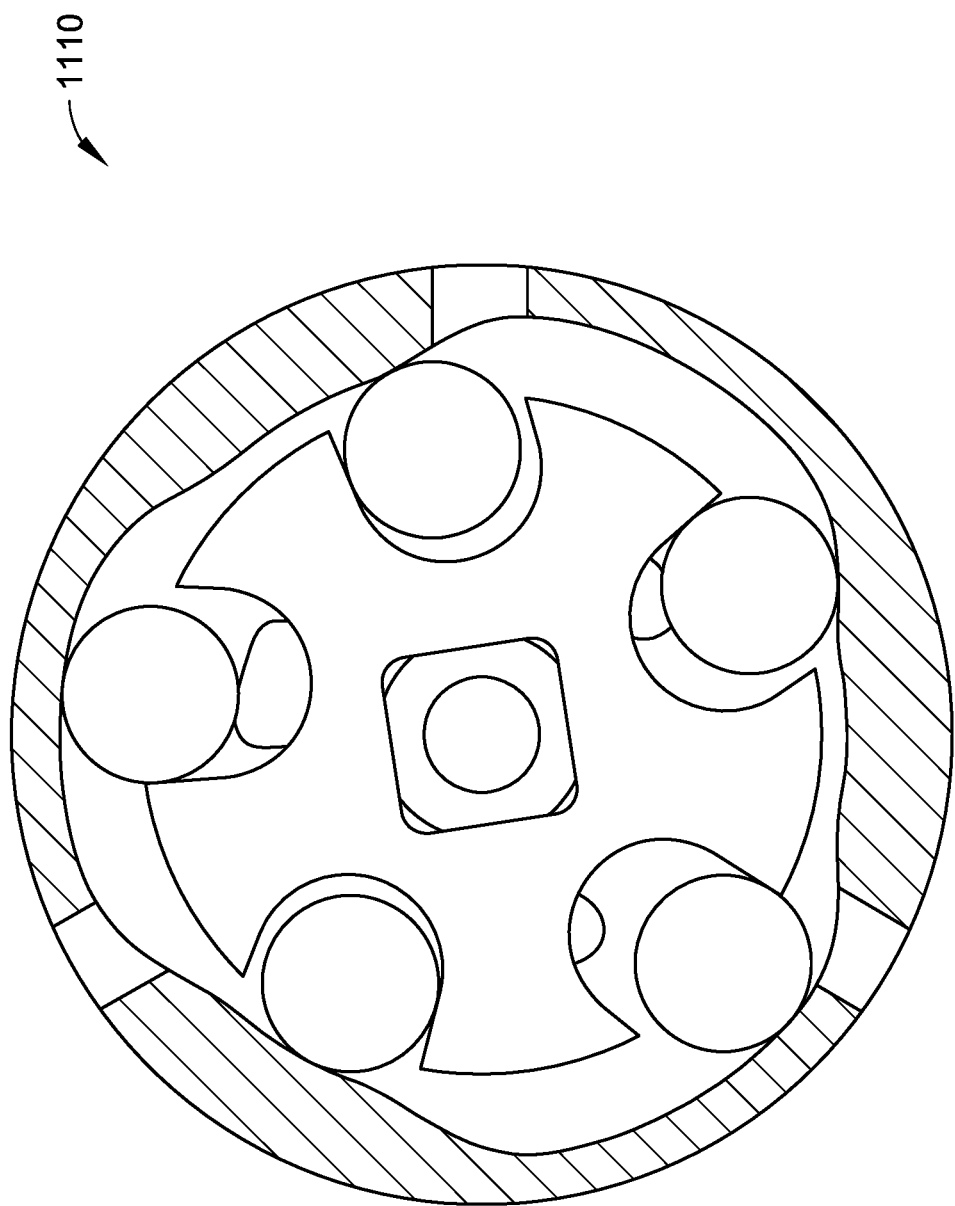
FIG. 13 illustrates an example apparatus implementing a roller vane motor in accordance with one or more embodiments.

Referring now to FIGS. 11 through 13, an inner rotating filter implemented using a filter assembly 1100 is described. The filter assembly 1100 includes a screen (e.g., a wedge wire screen 1102) in fluid communication with a diamond or other hard material filter 1104. The screen 1102 can perform initial filtering of drilling mud (e.g., to a fluid flow 1106 having a maximum particle size of about two one-hundredths of an inch (0.02 in.) (0.508 mm)). Then, the filter 1104 can be used to further filter the drilling mud (e.g., to a fluid flow 1108 having a maximum particle size of about two one-thousandths of an inch (0.002 in.) (0.0508 mm)). In embodiments of the disclosure, larger particles are not ground up, instead passing through the mechanism (e.g., bypassing to a roller vane motor 1110). This configuration can allow a standard wedge wire screen to be used for initial filtering. For example, with reference to FIG. 12, the fluid flow 1106 from the screen 1102 can pass through apertures which are aligned between an inner rotating member of the filter 1104 connected to the roller vane motor 1110 and an outer member of the filter 1104, while the fluid flow 1108 can be further filtered by directing the flow between adjacent surfaces of the inner rotating member of the filter 1104 and the outer member of the filter 1104, which can be very closely spaced (e.g., as previously described).

It should be noted that in some embodiments, the diamond or other hard material bushings used in this configuration do not necessarily lock up under pressure. Further, the diamond or other hard material roller vane motor 1110 can facilitate an increased motor length (e.g., for additional power output). With reference to FIG. 13, the large gap between the rotor and the stator of the roller vane motor 1110 can allow larger particles (e.g., having a maximum particle size of about two one-hundredths of an inch (0.02 in.) (0.508 mm)) to pass through the roller vane motor 1110. Further, referring again to FIG. 11, in some embodiments, the roller vane motor 1110 can be connected to additional devices, such as a generator 1112 and/or a generator 1114 (e.g., via an output shaft 1116, an output shaft 118, and so on). It should also be noted that while fluid flow filtered to an initial maximum particle size of about two one-hundredths of an inch (0.02 in.) (0.508 mm) and further filtered to a maximum particle size of about two one-thousandths of an inch (0.002 in.) (0.0508 mm) has been described with some specificity, these particle sizes are provided by way of example and are not meant to limit the present disclosure. Thus, in other embodiments, filtering can be provided to facilitate different maximum particle sizes.

Figure 14:
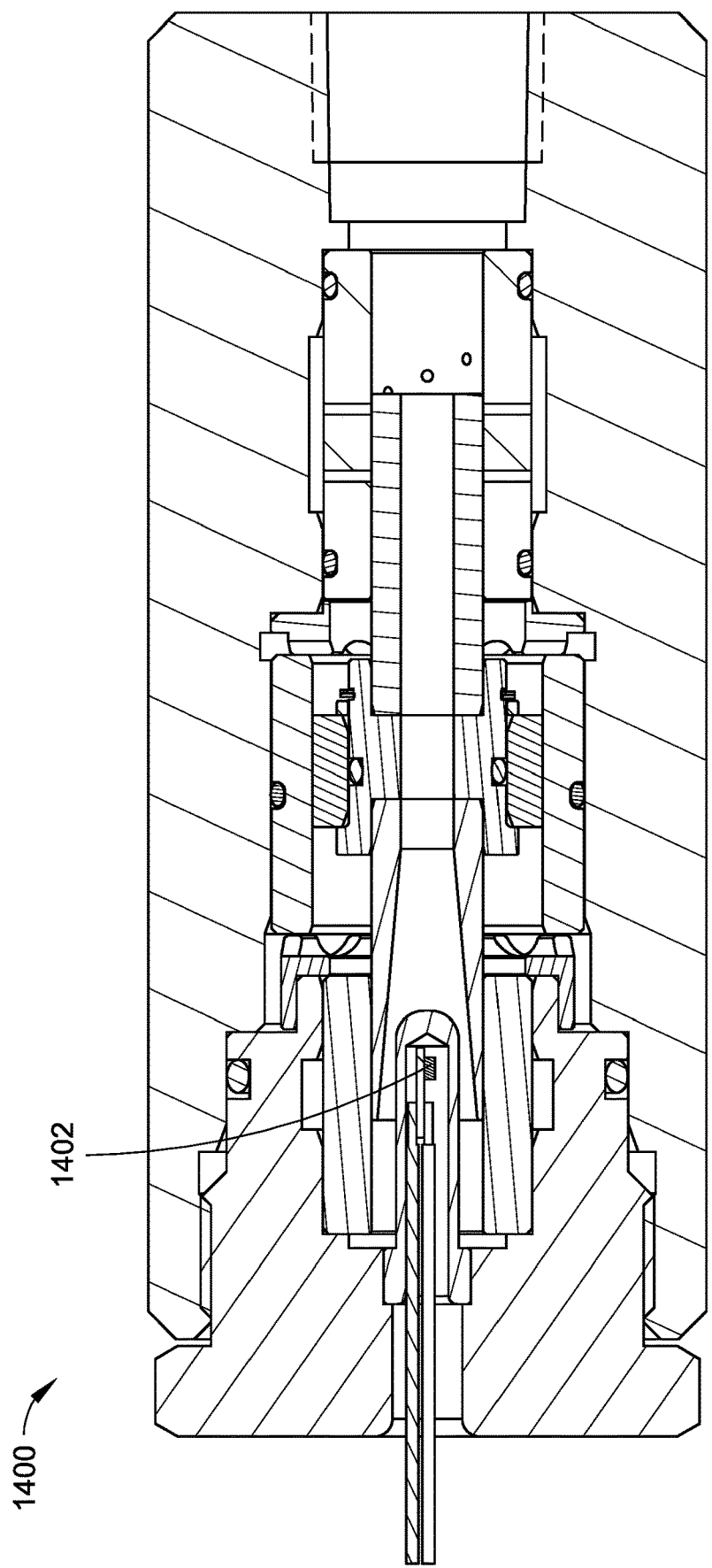
FIG. 14 illustrates an example apparatus implementing a proportional valve with a position sensor in accordance with one or more embodiments.
Figure 15:
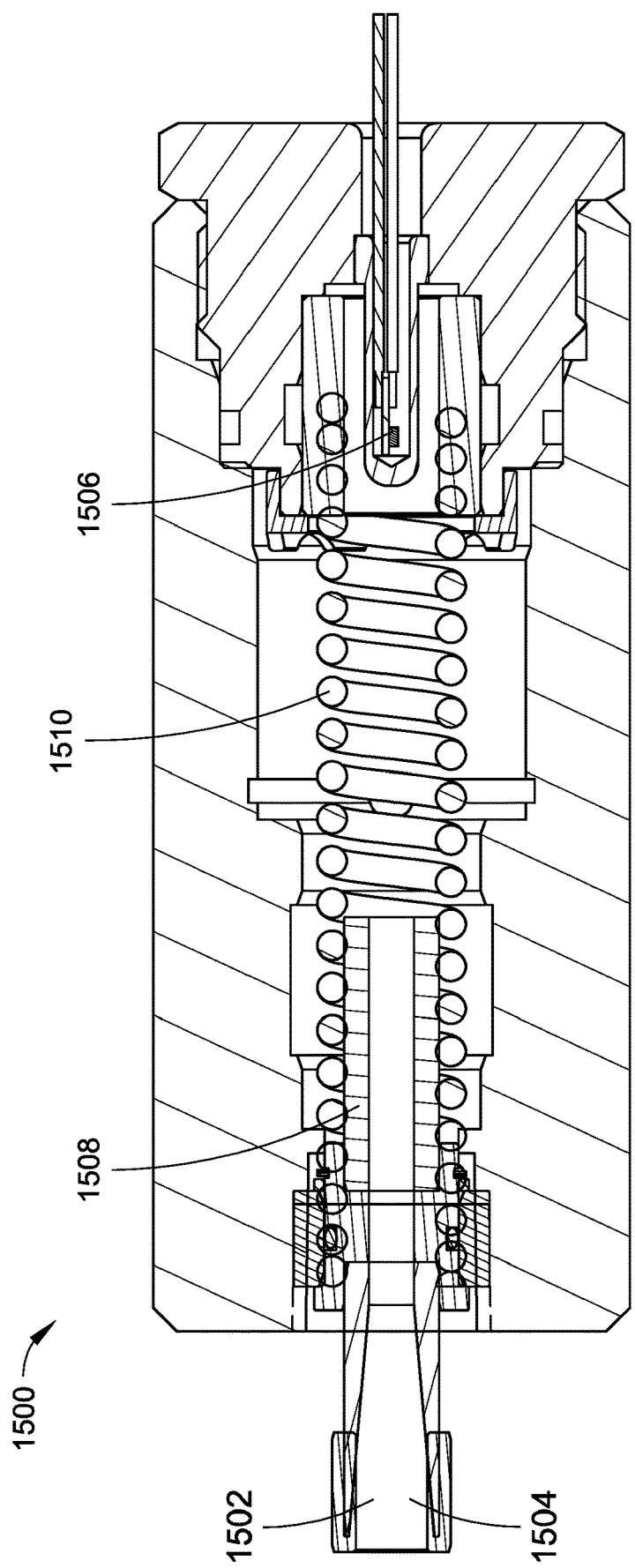
FIG. 15 illustrates an example apparatus implementing a pressure differential sensor in accordance with one or more embodiments.

With reference to FIG. 14, a proportional valve 1400 with a position sensor 1402 is described. In some embodiments, the proportional valve 1400 employs one or more diamond or other hard bearings. In other embodiments, the proportional valve does not employ such bearings. When connected to one or more diamond or other hard material filters (e.g., as previously described with reference to FIGS. 10 through 13), the proportional valve 1400 can facilitate tightly controlled proportional fluid flow, since the exhaust nozzles can be smaller than they would otherwise be with a flow that was not filtered (e.g., due to clogging from large sized particles). In some embodiments, the position of the proportional valve 1400 can be adjusted by opening actuator valves to supply fluid into one or the other side of the valve cavities. When the proportional valve is fully closed, an exhaust can be opened, and the piston can drain through the exhaust. With reference to FIG. 15, a pressure differential sensor 1500 employing a diamond or other hard material piston 1502 is described. The pressure differential sensor 1500 can include a high pressure inlet 1504, a position sensor 1506, a magnetic core 1508, and a biasing device (e.g., a pressure spring 1510).

Figure 16:
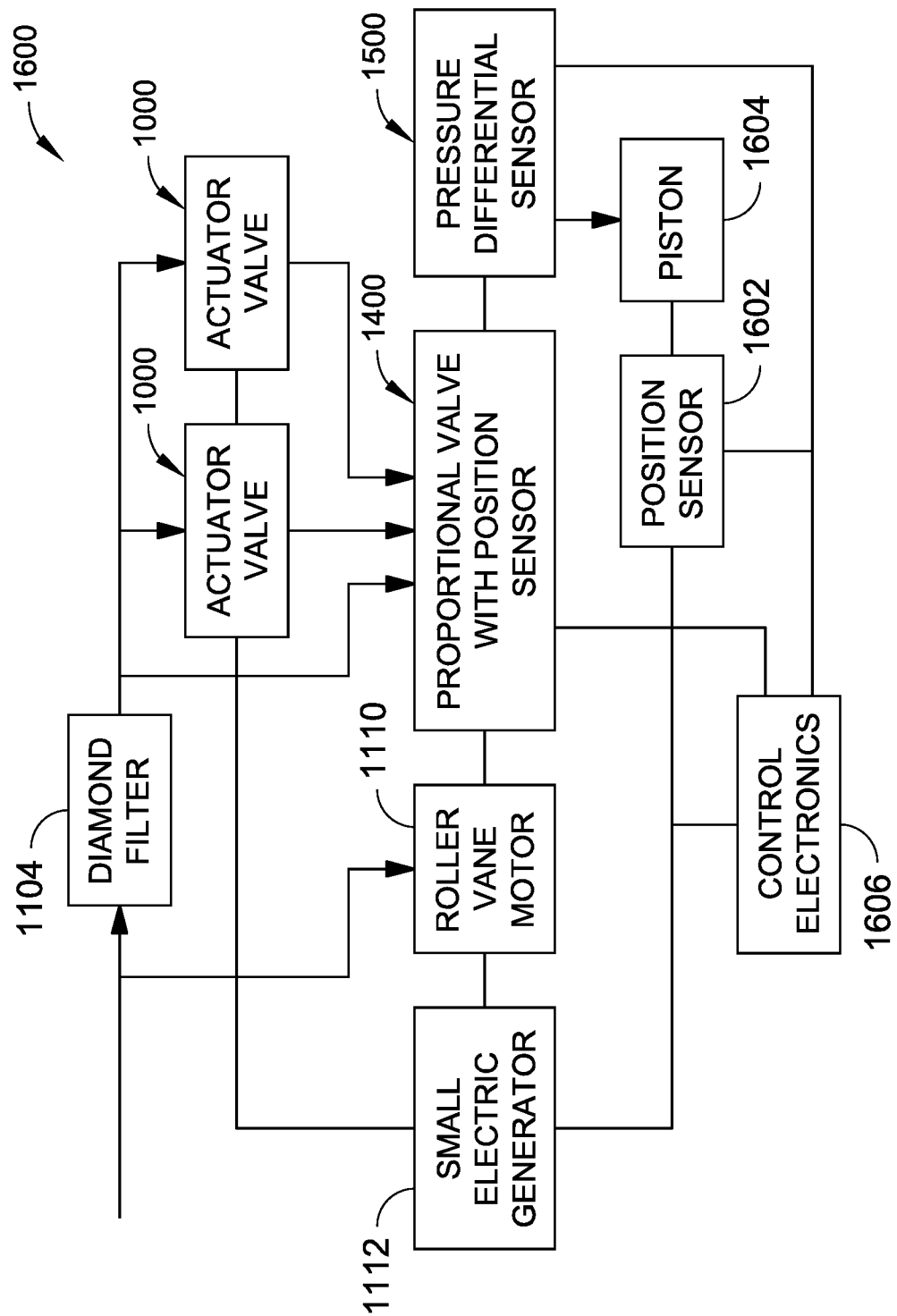
FIG. 16 illustrates an example system in which embodiments of systems and devices using hard bearings can be implemented.

Referring now to FIG. 16, a filtration system 1600 is described. The filtration system 1600 can include digital actuators 1000 described with reference to FIG. 10, the filter 1104 described with reference to FIGS. 11 and 12, the roller vane motor 1110 described with reference to FIGS. 11 and 13, the proportional valve 1400 (e.g., with position sensor 1402) described with reference to FIG. 14, and/or the pressure differential sensor 1500 described with reference to FIG. 15. The system can also include one or more electric generators (e.g., generator 1112 of FIG. 11), a position sensor 1602, a piston 1604, control electronics 1606, and so forth.

Although only a few example embodiments have been described in detail above, those skilled in the art will readily appreciate that many modifications are possible in the example embodiments without materially departing from systems and devices using hard bearings. Features shown in individual embodiments referred to above may be used together in combinations other than those which have been shown and described specifically. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A downhole system, comprising:
    a valve comprising:
        a first bearing surface formed from a hard material; and
        a second bearing surface formed from a hard material configured to translate with respect to the first bearing surface, the second bearing surface adjacent the first bearing surface, the first bearing surface and the second bearing surface defining a clearance for filtering particles larger than the clearance from a fluid flow flowing between the first bearing surface and the second bearing surface.

2. The system as recited in claim 1, wherein the valve is a proportional valve.

3. The system as recited in claim 2, wherein the proportional valve has a position sensor.

4. The system as recited in claim 1, wherein the downhole system comprises a displacement member and the valve controls a flow of fluid to the displacement member.

5. The system as recited in claim 4, wherein the downhole system comprises a rotary steerable system, the displacement member is in the rotary steerable system, and the displacement member comprises a piston configured to displace a pad toward a borehole wall.

6. The system as recited in claim 4, wherein the displacement member is configured to push on the borehole.

7. The system as recited in claim 4, wherein the displacement member is part of a point the bit system or a push the bit system.

8. The system as recited in claim 4, wherein when the valve is closed, an exhaust is opened to drain the fluid from the displacement member.

9. The system as recited in claim 1, wherein a screen is in fluid communication with the valve.

10. The system as recited in claim 9, wherein the screen is a wedge wire screen.

11. The system as recited in claim 9, wherein the screen filters particles larger than about 0.5 mm.

12. The system as recited in claim 1, wherein the valve is a digital valve.

13. The system as recited in claim 1, wherein the hard material comprises at least one of a diamond-based material or a tungsten carbide material.

14. The system as recited in claim 1, wherein the hard material comprises a polycrystalline material.

15. The system as recited in claim 1, wherein the valve comprises a third bearing surface formed from a hard material, and a fourth bearing surface formed from a hard material, the fourth bearing surface to bear against the third bearing surface.

16. The system as recited in claim 1, wherein the first bearing surface rotates with respect to the second bearing surface.

17. The system as recited in claim 1, wherein the first bearing surface slides with respect to the second bearing surface.

18. The system as recited in claim 1, wherein the clearance between the first bearing surface and the second bearing surface is between 0.0005 in (0.013 mm) and 0.005 in (0.13 mm).

19. The system as recited in claim 1, wherein the valve is a first valve and the system further comprises a second valve in series with the first valve.

20. The system as recited in claim 1, wherein the valve includes a solenoid actuator.

* * * * *